US011600269B2

(12) United States Patent
Pfeffinger et al.

(10) Patent No.: US 11,600,269 B2
(45) Date of Patent: Mar. 7, 2023

(54) TECHNIQUES FOR WAKE-UP WORD RECOGNITION AND RELATED SYSTEMS AND METHODS

(71) Applicant: CERENCE OPERATING COMPANY, Burlington, MA (US)

(72) Inventors: Meik Pfeffinger, Ulm (DE); Timo Matheja, Neu-Ulm (DE); Tobias Herbig, Ulm (DE); Tim Haulick, Blaubeuren (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 16/308,849

(22) PCT Filed: Jun. 15, 2016

(86) PCT No.: PCT/US2016/037495
§ 371 (c)(1),
(2) Date: Dec. 11, 2018

(87) PCT Pub. No.: WO2017/217978
PCT Pub. Date: Dec. 21, 2017

(65) Prior Publication Data
US 2019/0311715 A1     Oct. 10, 2019

(51) Int. Cl.
*G10L 15/00*     (2013.01)
*G10L 15/22*     (2006.01)
(Continued)

(52) U.S. Cl.
CPC .............. *G10L 15/22* (2013.01); *G06F 3/167* (2013.01); *G10L 15/08* (2013.01); *G10L 17/22* (2013.01);
(Continued)

(58) Field of Classification Search
USPC ................................. 704/205, 270, 233, 249
See application file for complete search history.

(56) References Cited

U.S. PATENT DOCUMENTS

| 5,428,707 A | 6/1995 | Gould et al. |
| 5,774,859 A | 6/1998 | Houser et al. |

(Continued)

FOREIGN PATENT DOCUMENTS

| CN | 101650943 A | 2/2010 |
| CN | 103021409 A | 4/2013 |

(Continued)

OTHER PUBLICATIONS

Chinese Office Action and Translation thereof for Chinese Application No. 201480013903.1 dated Jul. 28, 2017.
(Continued)

*Primary Examiner* — Edgar X Guerra-Erazo
(74) *Attorney, Agent, or Firm* — Brooks Kushman, P.C.

(57) ABSTRACT

A system for detection of at least one designated wake-up word for at least one speech-enabled application. The system comprises at least one microphone; and at least one computer hardware processor configured to perform: receiving an acoustic signal generated by the at least one microphone at least in part as a result of receiving an utterance spoken by a speaker; obtaining information indicative of the speaker's identity; interpreting the acoustic signal at least in part by determining, using the information indicative of the speaker's identity and automated speech recognition, whether the utterance spoken by the speaker includes the at least one designated wake-up word; and interacting with the speaker based, at least in part, on results of the interpreting.

17 Claims, 5 Drawing Sheets

(51) Int. Cl.
*G06F 3/16* (2006.01)
*G10L 15/08* (2006.01)
*G10L 17/22* (2013.01)

(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 5,802,305 A | 9/1998 | McKaughan et al. | |
| 5,983,186 A | 11/1999 | Miyazawa et al. | |
| 6,006,175 A * | 12/1999 | Holzrichter | A61B 5/0507 |
| | | | 704/205 |
| 6,070,140 A | 5/2000 | Tran | |
| 6,092,043 A | 7/2000 | Squires et al. | |
| 6,397,186 B1 | 5/2002 | Bush et al. | |
| 6,408,396 B1 | 6/2002 | Forbes | |
| 6,411,926 B1 | 6/2002 | Chang | |
| 6,449,496 B1 | 9/2002 | Beith et al. | |
| 6,594,630 B1 | 7/2003 | Zlokarnik et al. | |
| 6,756,700 B2 | 6/2004 | Zeng | |
| 6,859,776 B1 * | 2/2005 | Cohen | H04M 3/493 |
| | | | 704/270 |
| 6,941,265 B2 | 9/2005 | Bi et al. | |
| 6,965,786 B2 | 11/2005 | Qu et al. | |
| 7,114,090 B2 | 9/2006 | Kardach et al. | |
| 7,567,827 B2 | 7/2009 | Kim | |
| 7,574,361 B2 | 8/2009 | Yeager et al. | |
| 7,720,683 B1 | 5/2010 | Vermeulen et al. | |
| 7,774,204 B2 | 8/2010 | Mozer et al. | |
| 8,056,070 B2 | 11/2011 | Goller et al. | |
| 8,181,046 B2 | 5/2012 | Marcu et al. | |
| 8,190,420 B2 | 5/2012 | Kadirkamanathan et al. | |
| 8,285,545 B2 | 10/2012 | Lee et al. | |
| 8,548,176 B2 | 10/2013 | Bright | |
| 8,620,389 B2 | 12/2013 | Schrager | |
| 8,666,751 B2 | 3/2014 | Murthi et al. | |
| 8,977,255 B2 | 3/2015 | Freeman et al. | |
| 9,087,520 B1 * | 7/2015 | Salvador | G10L 25/84 |
| 9,112,984 B2 | 8/2015 | Sejnoha et al. | |
| 9,361,885 B2 | 6/2016 | Ganong, III et al. | |
| 9,558,749 B1 * | 1/2017 | Secker-Walker | G10L 15/18 |
| 9,646,610 B2 | 5/2017 | Macho | |
| 9,747,899 B2 * | 8/2017 | Pogue | G10L 15/22 |
| 9,940,936 B2 | 4/2018 | Sejnoha et al. | |
| 9,992,642 B1 * | 6/2018 | Rapp | H04M 1/271 |
| 10,057,421 B1 * | 8/2018 | Chiu | H04M 3/4936 |
| 10,332,525 B2 * | 6/2019 | Secker-Walker | G10L 15/18 |
| 10,373,612 B2 * | 8/2019 | Parthasarathi | G10L 15/08 |
| 10,521,512 B2 * | 12/2019 | Alders | G10L 13/033 |
| 10,536,773 B2 * | 1/2020 | Matheja | H04R 3/005 |
| 10,783,899 B2 * | 9/2020 | Graf | G10L 25/21 |
| 11,232,788 B2 * | 1/2022 | Yavagal | G10L 15/22 |
| 11,437,020 B2 * | 9/2022 | Prémont | G10L 15/08 |
| 2002/0193989 A1 | 12/2002 | Geilhufe et al. | |
| 2003/0040339 A1 | 2/2003 | Chang | |
| 2003/0120486 A1 | 6/2003 | Brittan et al. | |
| 2003/0216909 A1 | 11/2003 | Davis et al. | |
| 2007/0129949 A1 | 6/2007 | Alberth et al. | |
| 2008/0118080 A1 | 5/2008 | Gratke et al. | |
| 2009/0055178 A1 | 2/2009 | Coon | |
| 2010/0009719 A1 | 1/2010 | Oh et al. | |
| 2010/0121636 A1 | 5/2010 | Burke et al. | |
| 2010/0124896 A1 | 5/2010 | Kumar | |
| 2010/0185448 A1 | 7/2010 | Meisel | |
| 2010/0289994 A1 | 11/2010 | Nonaka | |
| 2011/0054899 A1 | 3/2011 | Phillips et al. | |
| 2012/0034904 A1 | 2/2012 | LeBeau et al. | |
| 2012/0035924 A1 | 2/2012 | Jitkoff et al. | |
| 2012/0127072 A1 | 5/2012 | Kim | |
| 2012/0197637 A1 | 8/2012 | Gratke et al. | |
| 2012/0281885 A1 * | 11/2012 | Syrdal | G06F 21/32 |
| | | | 382/116 |
| 2012/0310646 A1 | 12/2012 | Hu et al. | |
| 2012/0329389 A1 | 12/2012 | Royston et al. | |
| 2013/0080167 A1 | 3/2013 | Mozer | |
| 2013/0080171 A1 | 3/2013 | Mozer et al. | |
| 2013/0289994 A1 | 10/2013 | Newman et al. | |
| 2013/0339028 A1 | 12/2013 | Rosner et al. | |
| 2014/0012573 A1 | 1/2014 | Hung et al. | |
| 2014/0012586 A1 | 1/2014 | Rubin et al. | |
| 2014/0039888 A1 * | 2/2014 | Taubman | H04M 1/72572 |
| | | | 704/235 |
| 2014/0163978 A1 * | 6/2014 | Basye | G10L 15/28 |
| | | | 704/233 |
| 2014/0249817 A1 | 9/2014 | Hart et al. | |
| 2014/0274203 A1 | 9/2014 | Ganong, III et al. | |
| 2014/0274211 A1 | 9/2014 | Sejnoha et al. | |
| 2014/0278435 A1 | 9/2014 | Ganong, III et al. | |
| 2014/0365225 A1 * | 12/2014 | Haiut | G10L 15/22 |
| | | | 704/275 |
| 2015/0006176 A1 * | 1/2015 | Pogue | G10L 15/22 |
| | | | 704/249 |
| 2015/0053779 A1 * | 2/2015 | Adamek | F24F 11/30 |
| | | | 236/1 C |
| 2015/0106085 A1 | 4/2015 | Lindahl | |
| 2015/0340042 A1 | 11/2015 | Sejnoha et al. | |
| 2016/0039356 A1 | 2/2016 | Talwar et al. | |
| 2016/0078869 A1 * | 3/2016 | Syrdal | G06K 9/00315 |
| | | | 382/118 |
| 2016/0189706 A1 | 6/2016 | Zopf et al. | |
| 2016/0314782 A1 | 10/2016 | Klimanis | |
| 2016/0358605 A1 | 12/2016 | Ganong, III et al. | |
| 2017/0116983 A1 | 4/2017 | Furukawa et al. | |
| 2017/0270919 A1 * | 9/2017 | Parthasarathi | G10L 15/02 |
| 2018/0114531 A1 * | 4/2018 | Kumar | G10L 25/51 |
| 2018/0182380 A1 * | 6/2018 | Fritz | G10L 15/22 |
| 2018/0310144 A1 * | 10/2018 | Rapp | H04M 1/271 |
| 2018/0366114 A1 * | 12/2018 | Anbazhagan | G06F 9/4451 |
| 2019/0073999 A1 * | 3/2019 | Premont | G10L 15/32 |
| 2019/0284821 A1 * | 9/2019 | Pervan | E04F 13/165 |
| 2019/0287526 A1 | 9/2019 | Ren et al. | |
| 2019/0311715 A1 * | 10/2019 | Pfeffinger | G06F 3/167 |
| 2019/0355365 A1 * | 11/2019 | Kim | G10L 17/12 |
| 2020/0020329 A1 * | 1/2020 | Gordon | G06F 3/167 |
| 2020/0035231 A1 * | 1/2020 | Parthasarathi | G10L 15/02 |
| 2020/0184966 A1 * | 6/2020 | Yavagal | G10L 25/84 |

FOREIGN PATENT DOCUMENTS

| | | |
|---|---|---|
| CN | 103632668 A | 3/2014 |
| CN | 104575504 A | 4/2015 |
| CN | 105009204 A | 10/2015 |
| CN | 105575395 A | 5/2016 |
| CN | 106098059 A | 11/2016 |
| EP | 1511010 A1 | 3/2005 |
| EP | 2899955 A1 | 7/2015 |
| EP | 2932500 B1 | 2/2017 |
| WO | 2014/066192 A1 | 5/2014 |
| WO | WO-2015196063 A1 * | 12/2015 ........... G10L 13/033 |

OTHER PUBLICATIONS

International Preliminary Report on Patentability for International Application No. PCT/US2014/024270 dated Sep. 24, 2015.
International Preliminary Report on Patentability for International Application No. PCT/US2016/037495 dated Dec. 27, 2018.
International Preliminary Report on Patentability for International Application No. PCT/CN2016/105343 dated May 23, 2019.
International Search Report and Written Opinion for International Application No. PCT/US2014/024270 dated Jun. 16, 2014.
International Search Report and Written Opinion for International Application No. PCT/CN2016/105343 dated Sep. 21, 2017.
International Search Report and Written Opinion for International Application No. PCT/US2016/037495 dated Dec. 5, 2016.
U.S. Appl. No. 16/074,953, filed Aug. 2, 2018, Prémont et al.
PCT/US2016/017317, Aug. 23, 2018, International Preliminary Report on Patentability.
PCT/US2016/017317, May 12, 2016, International Search Report and Written Opinion.

(56) References Cited

OTHER PUBLICATIONS

International Preliminary Report on Patentability for International Application No. PCT/US2016/017317 dated Aug. 23, 2018.
International Search Report and Written Opinion for International Application No. PCT/US2016/017317 dated May 12, 2016.
U.S. Appl. No. 13/795,933, filed Mar. 12, 2013, Ganong et al.
U.S. Appl. No. 13/795,960, filed Mar. 12, 2013, Ganong et al.
U.S. Appl. No. 14/814,192, filed Jul. 30, 2015, Sejnoha et al.
U.S. Appl. No. 15/238,238, filed Aug. 16, 2016, Ganong et al.
U.S. Appl. No. 16/348,689, filed May 9, 2019, Ren et al.
CN 201480013903.1, Jul. 28, 2017, Office Action.
PCT/US2014/024270, Jun. 16, 2014, International Search Report and Written Opinion.
PCT/CN2016/105343, Sep. 21, 2017, International Search Report and Written Opinion.
PCT/CN2016/105343, May 23, 2019, International Preliminary Report on Patentability.
PCT/US2016/037495, Dec. 5, 2016, International Search Report and Written Opinion.
PCT/US2016/037495, Dec. 27, 2018, International Preliminary Report on Patentability.

\* cited by examiner

| Speaker ID | Position | Authorized Applications | Wake-up Words |
|---|---|---|---|
| Alice | Driver's Seat, Front Passenger Seat | All | "Listen-up" |
| Bob | Driver's Seat | All | "Wakey-wakey" |
| Charlie | Backseat; Front Passenger Seat | Entertainment; Telephony | Entertainment - ("TV"); Telephone - "Call Someone" |
| David | Backseat; Front Passenger Seat | None | None |

TECHNIQUES FOR WAKE-UP WORD RECOGNITION AND RELATED SYSTEMS AND METHODS

This application is a national stage application under 35 U.S.C. § 371 of PCT Application No. PCT/US2016/037495, filed Jun. 15, 2016, which is hereby incorporated by reference in its entirety.

BACKGROUND

A system may be speech enabled, allowing users to interact with the system via speech, for example, by allowing users to speak commands to control the system. Engaging a speech-enabled system often requires users to signal to the speech-enabled system that the user intends to interact with the system by speaking. For example, a speech-enabled system may be configured to begin recognizing speech after a manual trigger, such as a button push (e.g., a button of a physical device and/or a button within a user interface of a speech recognition software application), launch of an application, or other manual interaction with the system, is provided to alert the system that speech following the manual trigger is directed to the system. However, manual triggers complicate the interaction with the speech-enabled system and, in some cases, may be inconvenient or impossible to use (e.g., when the user's hands are otherwise occupied, such as when operating a vehicle, or when the user is too remote from the system to manually engage with the system or an interface thereof).

To address the inconvenience (and often inapplicability) of manual triggers, some speech-enabled systems allow for voice triggers to be spoken to begin engaging with the system, thus eliminating at least some (if not all) manual actions and facilitating generally hands-free access to the speech-enabled system. A voice trigger may comprise a designated word or phrase (e.g., "Hello Dragon") that is spoken by the user to indicate to the speech-enabled system that the user intends to interact with the system (e.g., to issue one or more commands to the system). A voice trigger is also referred to herein as a "wake-up word" or "WuW." After a wake-up word has been detected, the system begins recognizing subsequent speech spoken by the user. In most cases, unless and until the system detects the wake-up word, the system will assume that acoustic input received from the environment is not directed to or intended for the system and will not process the acoustic input further. As such, it is important that a speech-enabled system be able to detect, with a relatively high degree of accuracy, when a wake-up word has been uttered.

SUMMARY

Some embodiments are directed to a system for detecting at least one designated wake-up word for at least one speech-enabled application. The system comprises at least one microphone; and at least one computer hardware processor configured to perform: receiving an acoustic signal generated by the at least one microphone at least in part as a result of receiving an utterance spoken by a speaker; obtaining information indicative of the speaker's identity; interpreting the acoustic signal at least in part by determining, using the information indicative of the speaker's identity and automated speech recognition, whether the utterance spoken by the speaker includes the at least one designated wake-up word; and interacting with the speaker based, at least in part, on results of the interpreting.

Some embodiments are directed to a method for detecting at least one designated wake-up word for at least one speech-enabled application. The method comprises using at least one computer hardware processor to perform: receiving an acoustic signal generated by at least one microphone at least in part as a result of receiving an utterance spoken by a speaker; obtaining information indicative of the speaker's identity; interpreting the acoustic signal at least in part by determining, using the information indicative of the speaker's identity and automated speech recognition, whether the utterance spoken by the speaker includes the at least one designated wake-up word; and interacting with the speaker based, at least in part, on results of the interpreting.

Some embodiments are directed to at least one non-transitory computer-readable storage medium storing processor-executable instructions that, when executed by at least one computer hardware processor, cause the at least one computer hardware processor to perform a method for detecting at least one designated wake-up word for at least one speech-enabled application. The method comprises: receiving an acoustic signal generated by at least one microphone at least in part as a result of receiving an utterance spoken by a speaker; obtaining information indicative of the speaker's identity; interpreting the acoustic signal at least in part by determining, using the information indicative of the speaker's identity and automated speech recognition, whether the utterance spoken by the speaker includes the at least one designated wake-up word; and interacting with the speaker based, at least in part, on results of the interpreting.

BRIEF DESCRIPTION OF DRAWINGS

Various aspects and embodiments will be described with reference to the following figures. The figures are not necessarily drawn to scale.

DETAILED DESCRIPTION

Many speech-enabled systems allow for generally hands-free engagement via the use of wake-up words. A wake-up word may be a one-word spoken utterance, a multiple-word spoken utterance, and/or any spoken utterance (of any suitable length that, for example, may be shorter than a single word) that can be spoken by a user to signal his/her intent to interact with a speech-enabled system. Since a wake-up word must in general be recognized before the speech-enabled system becomes responsive to the user (e.g., before the system will respond to further voice commands), it is desirable that the wake-up word be recognized with a high degree of accuracy. False positive and false negative rates that are too high result in a system with unsatisfactory responsiveness, which leads to user frustration and annoyance. As such, speech-enabled systems benefit from robust wake-up word detection.

As speech-enabled environments become increasingly sophisticated, speech-enabled systems may need to be responsive to multiple different speakers that may seek to engage and/or interact with multiple applications. For example, a vehicle (e.g., a car) may include a hands-free telephony system, a vehicle navigation system, a sound system, a television system and/or one or more controllable vehicle components (e.g., windows, climate control, etc.) that the driver and/or passengers may desire to control via speech. As another example, a smart home or smart room may include a television, sound system, lighting system, climate control, security system, and/or other system(s) that one or more occupants may seek to interact with via speech. Many conventional systems are configured to detect a single wake-up word and may be capable of doing so satisfactorily in environments when only a single user is speaking. Such conventional systems may be unsuitable for environments having multiple speakers, potentially speaking simultaneously or in close proximity and/or potentially seeking to engage with different aspects of the system (e.g., different speech-enabled applications or systems in the same environment).

The inventors have recognized that the ability to differentiate among speakers not only facilitates more robust wake-up word detection, but also may provide each speaker with a more personalized interaction with a speech-enabled system, for example, through personalization of wake-up words and/or other customization of the speech-enabled system to the speaker. Accordingly, in some embodiments, a speech-enabled system may be configured to obtain information indicative of a speaker's identity and use the obtained information to improve wake-up word detection and make it more robust, to improve the quality of interaction between the speaker and the system, and/or for any other suitable purpose(s) examples of which are provided below.

Information indicative of a speaker's identity may include any information that could be used to ascertain the identity of the speaker and/or to differentiate between the speaker and one or more other speakers, and in some embodiments, a speech-enabled system may use the obtained information indicative of a speaker's identity to do so. In some embodiments, information indicative of the speaker's identity may include information relating to the characteristics of the speaker's speech that could be used to identify the speaker's identity. For example, a speech-enabled system may compare stored speech characteristics (e.g., a stored "voice print") of a speaker, who is known to the system (e.g., by being registered with the system), to speech characteristics obtained from acoustic input received from the environment to ascertain whether the acoustic input includes speech from the speaker. In some embodiments, when a speaker's characteristics do not match any speech characteristics stored by the system, the system may allow the speaker to register with the system. Additionally or alternatively, information indicative of the speaker's identity may include any information about the speaker's behavior that could be used to ascertain the speaker's identity. One example of such information about the speaker's behavior is information indicating where a speaker is usually located when issuing commands to a speech-enabled system. For example, a given speaker may typically be the driver of a particular vehicle and a speech-enabled system in the vehicle can ascertain the identity of this speaker (or the likely identity of the speaker) by determining that speech input was received from the driver's seat. Similarly, a person's usual location in a smart room may be used to ascertain the identity of a speaker. Other information indicative of the identity of the speaker may also be used, as aspects of the technology described herein are not limited in this respect. For example, in some embodiments, the system may learn habits of one or more speakers over time and can use information about a speaker's habits to identify a speaker and/or improve the robustness of detecting wake-up words spoken by the speaker.

Some embodiments described herein address all of the above-described issues that the inventors have recognized with conventional systems for performing wake-up word detection. However, not every embodiment described below addresses every one of these issues, and some embodiments may not address any of them. As such, it should be appreciated that embodiments of the technology described herein are not limited to addressing all or any of the above-discussed issues of conventional systems for performing wake-up word detection.

In some embodiments, a speech-enabled system may be configured to detect a particular wake-up word by: receiving an acoustic signal generated by one or more microphones at least in part as a result of receiving an utterance spoken by a speaker; obtaining information indicative of the speaker's identity; interpreting the acoustic signal by using the information indicative of the speaker's identity to determine whether the utterance spoken by the speaker includes the particular wake-up word; and interacting with the speaker based, at least in part on results of interpreting the acoustic signal. For example, when the speech-enabled system determines that the utterance spoken by the speaker includes the particular wake-up word, the speech-enabled system may interact with the speaker by allowing the speaker to control (e.g., by speaking one or more voice commands) one or more speech-enabled applications executing on the speech-enabled system. On the other hand, when the speech-enabled system determines that the utterance spoken by the speaker does not include a wake-up word, the speech-enabled system may not allow the speaker to control any speech-enabled applications executing on the speech-enabled system.

In some embodiments, a speech-enabled system may be configured to determine the speaker's identity (e.g., by processing the speaker's speech, by analyzing the speaker's behavior, by comparing the speaker's behavior to stored information characterizing habits of speakers, based at least in part on the speaker's position in the environment, and/or in any other suitable way) and use the speaker's identity to determine whether the utterance spoken by the speaker includes a particular wake-up word. The speech-enabled system may use the speaker's identity to determine whether the utterance spoken by the speaker contains the particular wake-up word in any suitable way. In some embodiments, for example, the speech-enabled system may store a personalized list of one or more wake-up words for each of one or multiple speakers. After the speech-enabled system determines a speaker's identity, the system may access a list of one or more wake-up words associated with the identified speaker and provide contents of the list to a speech recognizer for use in performing automated speech recognition on the speaker's utterance to determine whether the utterance contains any wake-up word(s) in the list of accessed wake-up words.

Providing a speech recognizer with access to a "personalized" list of wake-up words associated with a speaker may significantly improve the speech recognizer's ability to accurately determine whether a speaker uttered any one of the wake-up words on the list. For example, a speech recognizer may use the list of wake-up words to constrain its search space to words on the list (as opposed to searching among all possible words in the recognizer's vocabulary) so as make its wake-up word recognition performance more robust, for example, by increasing the likelihood that a wake-up word on the list is recognized when it is uttered, reducing the likelihood that a wake-up word on the list is recognized when it is not uttered (i.e., reduce the likelihood of a false positive occurring), and/or reducing the likelihood that a wake-up word on the list is not recognized when it is uttered (i.e., reduce the likelihood of a false negative occurring). Additionally or alternatively, the speech recognizer may use the personalized list of wake-up words to adapt one or more of its components (e.g., one or more acoustic models, one or more pronunciation models, one or more language models, one or more finite state transducers, one or more lexicons or vocabularies, and/or any other suitable component(s)) so as to make its wake-up word recognition performance more robust.

As another example, in some embodiments, a list of wake-up words associated with a speaker may be used to compensate for interference (e.g., noise, speech of one or more other speakers) present in the acoustic signal containing the speaker's utterance and/or for any artefacts caused by such interference. For example, when only a portion of a particular wake-up word is detected by the speech-enabled system due to the presence of interference, the detected portion may be compared against one or more entries in the list of wake-up words to identify that the particular wake-up word was likely spoken by the speaker even though the entire wake-up word was not detected due to the interference. As a specific example, a speaker may utter the phrase "Hello, my favorite car" as a wake-up word to a speech-enabled navigation system in the speaker's car. However, due to acoustic noise, the speech-enabled navigation system may have only detected the portion "Hello, my fav" of the utterance due to noise. By comparing the detected portion "Hello, my fav" to the entry "Hello, my favorite car" in the list of wake-up words associated with the speaker, the speech-enabled navigation system may determine that, because the detected portion matches at least a threshold portion of a wake-up word in the list, the speaker likely uttered the wake-up word "Hello, my favorite car" and may allow the speaker to vocally control the speech navigation system. In this way, the speaker's wake-up word is recognized despite the presence of the noise, and the speaker's experience in interacting with the speech-enabled navigation system may be improved.

It should be appreciated, however, that a speech-enabled system is not limited to using a speaker's identity solely for improving its wake-up word recognition performance. Rather, a speech-enabled system may use a speaker's identity (or, more generally, information indicative of the speaker's identity) for other purposes in addition to or instead of improving the robustness of its wake-up word recognition performance. In some embodiments, for example, a speech-enabled system may use information indicative of a speaker's identity to personalize its interaction with the speaker. For example, the speech-enabled system may allow speakers to have personalized wake-up words. For example, the speech-enabled system may be configured to allow a particular speaker to use a designated wake-up word specific to the particular speaker in order to wake-up a speech-enabled application. The speech-enabled system may be further configured to not allow any speaker other than the particular speaker to use the designated wake-up word to wake up the speech enabled application. To implement such functionality, in some embodiments, a speech-enabled system may determine a speaker's identity and use the speaker's identity to limit the wake-up words the system will recognize to the wake-up words associated with the speaker's identity, as described herein. In this way, each individual may select a different wake-up word to engage with aspects of a speech-enabled system (e.g., a navigation or sound system in a vehicle, a television or lighting system in a home, etc.).

In some embodiments, a speech-enabled system may personalize its interaction with a speaker by inferring, based at least in part on information indicative of the speaker's identity, one or more actions to take when interacting with the speaker. For example, the speech-enabled system may identify, based on the speaker's identity, information indicative of the speaker's preferences and/or interests and take one or more actions based on the information indicative of the speaker's preferences and/or interests when interacting with the speaker. As a specific example, when a speaker says, "play my favorite music," the speech-enabled system may determine the speaker's favorite music based on the speaker's identity and commence playback of that music.

In some embodiments, a speech-enabled system may use information indicative of a speaker's identity to implement access control measures. A speech-enabled system may be configured to execute one or more speech-enabled applications and interact with one or multiple different speakers. However, a speech-enabled system may be configured to prevent some speakers from controlling some speech-enabled applications. A speech-enabled system may be configured to allow a particular speaker to control none, some (e.g., one or more but not all), or all speech-enabled applications executing on the system. Accordingly, in some embodiments, a speech-enabled system may determine, using information indicative of the speaker's identity, whether the speaker is authorized to control a particular speech-enabled application and, when it is determined that the speaker is authorized to control the particular speech-enabled application, may allow the speaker to do so. On the other hand, when the speech-enabled system determines that a speaker is not authorized to control the particular speech-enabled application, the speech-enabled system may prevent the speaker from doing so.

For example, information indicative of a speaker's identity may include the speaker's position within the environment, and the speech-enabled system may determine whether the speaker is authorized to control a particular speech-enabled application based, at least in part, on the speaker's position. As a specific example, a speech-enabled system may allow any speaker seated in the driver's seat of a car to control a speech-enabled navigation application, but not allow any speaker seated in the back seat of a car to control the navigation application. As another example, information indicative of a speaker's identity may include the speaker's identity, and the speech-enabled system may determine whether a speaker is authorized to control a particular speech-enabled application based on his/her identity. To this end, the speech-enabled system may maintain information indicating which speakers are (and/or are not) authorized to control various speech-enabled applications and use this information together with a speaker's identity to determine whether the speaker is authorized to control a particular speech-enabled application.

In some embodiments, a speech-enabled system may use information indicative of the identity of one or more speakers to process voice input concurrently uttered by multiple different speakers. Two speakers may speak concurrently when the periods during which the speakers are speaking at least partially overlap one another. For example, a speech-enabled system may use information about the position and/or identity of multiple different speakers to process voice inputs provided by the multiple speakers simultaneously or in close proximity to one another. As a specific example, a driver of a car may utter a first wake-up word for a speech-enabled navigation application (e.g., to get directions to a destination) concurrently with a passenger in the backseat of a car uttering a second wake-up word for a speech-enabled telephony application (e.g., in order to make a phone call). The speech-enabled system may be configured to process the utterances of the driver and passenger, using information indicating their position and/or identity, to determine: (1) whether the driver uttered a wake-up word for the navigation (or any other) application (e.g., by accessing a personalized list of wake-up words associated with the driver); (2) whether the driver is authorized to control the navigation application (e.g., based on the driver's position in the car and/or the driver's identity); (3) whether the passenger uttered a wake-up word for the telephony (or any other) application (e.g., by accessing a personalized list of wake-up words associated with the passenger); and/or (4) whether the passengers is authorized to control the telephony application (e.g., based on the passenger's identity and/or position in the car).

Following below are more detailed descriptions of various concepts related to, and embodiments of, techniques of detecting wake-up words. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 1:
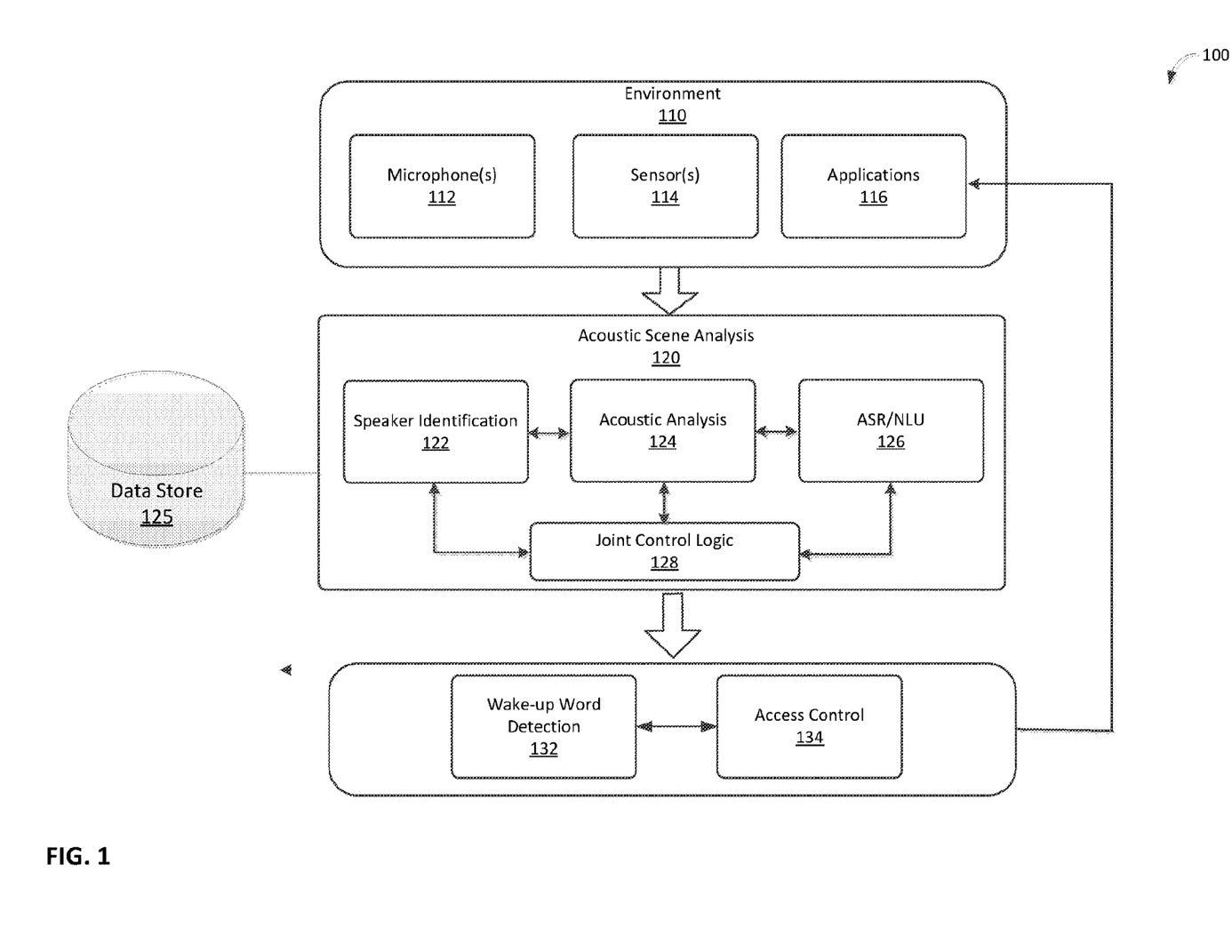
FIG. 1 is a block diagram of an illustrative speech-enabled system, in accordance with some embodiments of the technology described herein.

FIG. 1 is a block diagram of an illustrative speech-enabled system 100, in accordance with some embodiments of the technology described herein. System 100 includes microphone(s) 112, sensor(s) 114, and speech-enabled application(s) 116, which may be part of environment 110. Environment 110 may be any suitable environment in which a user may control on or more speech-enabled application(s) 116. For example, environment 110 may be a vehicle (e.g., a car, a bus, a boat, etc.), a smart home, a smart room, or any other suitable environment. Environment 110 may include one or multiple speakers. That speech-enabled application(s) 116 are part of the environment 110 does not require that these application(s) are executing on a processor physically located within the environment 100. Rather, a speaker in environment 110 need only to be able to interact with an interface (e.g., a speech-enabled interface) of a speech-enabled application for that application to be considered as being in environment 110, as shown in FIG. 1.

In some embodiments, microphone(s) 112 may include any number and type of any suitable transducer(s) configured to convert acoustic waves into electrical signals. According to some embodiments, microphone(s) 112 may include one or more sound pressure microphones, electret microphones, binaural microphones, MEMS microphones, or combinations thereof. However, it should be appreciated that any type of microphone in any combination may be used, as aspects of the technology described herein are not limited in this respect. In some embodiments, microphone(s) 112 may include a microphone for each potential position of a speaker in the environment 110. For example, when the environment 110 is a car, environment 110 may include a microphone for each of one or more seats in the car.

In some embodiments, sensor(s) 114 may include any number and type of any suitable hardware sensors configured to detect information about the environment and/or speaker(s) in the environment 110. For example, sensor(s) 114 may include one or more sensors (e.g., one or more pressure sensors, one or more camera sensors to provide optical data, one or more motion sensors, one or more sensors configured to determine whether a seatbelt has been fastened, etc.) configured to detect a position and/or identity of a speaker. As another example, sensor(s) 114 may include one or more sensors configured to measure aspects of the environment 110. For example, when the environment 110 is a vehicle, sensor(s) 114 may be configured to measure the speed of the vehicle, determine whether one or more windows and/or doors of the vehicle are open, determine whether one or more speech-enabled applications 116 is being used by any speaker, and/or any other suitable information about environment 110.

In some embodiments, application(s) 116 include one or more speech-enabled applications with which a speaker in environment 110 may interact by speaking. Examples of speech-enabled applications include, but are not limited to, a speech-enabled navigation application (e.g., via which a user may obtain driving directions to a destination), a speech-enabled telephony application (e.g., via a user may conduct phone calls), any application configured to perform text-to-speech synthesis (TTS), a speech-enabled entertainment application (e.g., via which a user may view one or more television programs, browse the Internet, play video games, communicate with one or more other users, etc.), a speech-enabled car information application, in embodiments where environment 110 is a car, an in-car communication (ICC) system allowing users in a vehicle to communicate with one another, in embodiments where environment 110 is a car, and a speech-enabled application for controlling one or more appliances, heat, air conditioning, and/or lighting, in embodiments where the environment 110 is a smart home.

System 100 further includes a smart acoustic scene analysis component 120 that may be configured to obtain and analyze input from the environment 110, including input obtained via microphone(s) 112 and sensor(s) 114. For example, smart acoustic scene analysis component 120 may be configured to obtain an acoustic signal generated by microphone(s) 112 and perform processing in furtherance of determining whether the acoustic signal includes a wake-up word for any one of the speech-enabled application(s) 116.

As shown in the embodiment of FIG. 1, smart acoustic scene analysis component 120 includes speaker identification component 122, acoustic analysis component 124, automatic speech recognition (ASR)/natural language understanding (NLU) component 126, and joint control logic 128. Each of components 122, 124, 126 and logic 128 (and components 132 and 134 discussed in more detail below) may be implemented in software (e.g., using processor-executable instructions), in hardware, or as a combination of software and hardware.

In some embodiments, speaker identification component 122 may be configured to identify a speaker of an utterance based, at least in part, on information obtained from the environment 110. In some embodiments, speaker identification component 122 may be configured to obtain one or more acoustic signals from environment 110, resulting from a speaker's utterance (e.g., acoustic signals generated by microphone(s) 112 in response to receiving a speaker's utterance) and process the acoustic signals to identify the speaker. This processing may be done in any suitable way. For example, speaker identification component 122 may obtain one or more speech characteristics (e.g., a voice print) from the acoustic signal(s) obtained from environment 110 and compare the obtained speech characteristics against stored speech characteristics of speakers registered with the system 100 (e.g., enrolled speakers) in order to determine the identity of the speaker. The speech characteristics of registered speakers may be stored in any suitable non-transitory computer-readable storage medium or media and, for example, may be stored in data store 125 shown in FIG. 1. In some embodiments, speaker identification component 122 may be configured to assist in registering new speakers with system 100 using any suitable speaker enrollment technique. For example, speaker identification component 122 may be configured to enroll a speaker during runtime when the speaker's speech characteristics do not match any of the speech characteristics (of other speakers) stored by system 100. In some embodiments, the speaker identification component 122 may use one or more statistical models (e.g., speaker-specific statistical models) representing voice biometrics of speakers registered with the system 100 to determine the identity of the speaker. It should be appreciated, however, that speaker identification component 122 could use any suitable speaker recognition technique to determine the identity of the speaker from the acoustic signal(s) obtained from environment 110, as aspects of the technology described herein are not limited in this respect.

In some embodiments, speaker identification component 122 may be configured to identify a speaker based, at least in part, on information other than acoustic information obtained from the speaker's environment. For example, component 122 may obtain information about the position of the speaker (e.g., from acoustic analysis component 124, from sensor(s) 114, etc.) and use information about the speaker's position to determine the speaker's identity or likely identity. For example, a speaker may typically be the driver of a vehicle and component 122 may determine the identity or likely identity of this speaker by determining that speech input was received from the driver's seat of the vehicle. It should be appreciated, however, that component 122 may use any other suitable information to determine a speaker's identity or likely identity, as aspects of the technology described herein are not limited in this respect.

In some embodiments, acoustic analysis component 124 may be configured to process any acoustic signals obtained in environment 110 to obtain (e.g., to detect and/or estimate) various quantities of interest about the acoustic environment of the speaker, examples of which quantities are provided below. However, these examples are illustrative and non-limiting, as component 124 may be configured to process acoustic signal(s) to obtain any other suitable quantities of interest about the acoustic environment of the speaker.

In some embodiments, acoustic analysis component 124 may be configured to characterize any acoustic noise present in the speaker's acoustic environment. Non-limiting examples of such acoustic noise include environmental noise (e.g., due to wind, rain, etc.), electrical noise (e.g., buzzing of an electrical device, buzzing of an electrical line at 60 Hz, etc.), background music, and interfering speech by one or more other speakers (e.g., babble noise). Component 124 may be configured to use any suitable noise estimation techniques to identify the presence of acoustic noise, determine the type of acoustic noise present, and/or determine the energy/power of the acoustic noise present (e.g., in any suitable portion of the spectrum including in one or multiple sub-bands). Any of this or other information determined by the component 124 about the acoustic noise may be used by the system 100 in furtherance of various tasks including, removing noise from the acoustic signals obtained by microphone(s) 112 (e.g., via a suitable speech enhancement technique), estimating and removing echo components arising in the microphones from played back music (e.g., by performing acoustic echo cancellation), speech prompts or other signals known by the system internally, estimating the signal to noise ratio, performing voice activity detection, setting parameters of speech recognition algorithms (e.g., to compensate and/or otherwise account for the presence of noise), determining whether speech recognition results should be post-processed to account for the presence of noise, and the like.

In some embodiments, acoustic analysis component 124 may be configured to perform speech activity detection, sometimes termed voice activity detection, to identify portions of the acoustic signal that likely contain speech from one or multiple speakers. Component 124 may be configured to perform speech activity detection based, at least in part, on an amount of energy/power detected in the acoustic signal(s) above the amount of acoustic noise determined to be present in the acoustic signal(s) and/or in any other suitable way, as aspects of the technology described herein are not limited in this respect.

In some embodiments, acoustic analysis component 124 may be configured to determine a speaker's location in the environment 110 based on the acoustic signal(s) provided by microphone(s) 112. Component 124 may determine the speaker's location in the environment 110 by applying any suitable acoustic source localization and/or beamforming technique to the acoustic signal(s). Additionally or alternatively, component 124 may use acoustic signals provided by multiple microphones to reduce or remove acoustic noise present in the acoustic signals. This may be done using any suitable multi-microphone speech enhancement technique, which, for example, may use beamforming or otherwise take advantage of correlation among multiple acoustic signals obtained by microphone(s) 112.

In some embodiments, ASR/NLU component 126 may be configured to perform automated speech recognition and/or natural language understanding on the acoustic signal(s) obtained in environment 110. ASR/NLU component 126 may include at least one ASR engine configured to perform speech recognition on the acoustic signal(s) obtained in environment 110. The at least one ASR engine may be configured to perform automated speech recognition using one or more acoustic models, one or more grammars, one or more finite state transducers, one or more language models, one or more pronunciation models, one or more vocabularies, and/or any other suitable components for performing ASR. The at least one ASR engine may be configured to implement any suitable ASR technique(s), including any techniques that make use of the above-described components of an ASR engine, and may include processor-executable instructions that, when executed by system 100, perform such ASR technique(s). Text obtained by recognizing speech present in the acoustic signal(s) obtained in the environment 110 may be used to determine whether the speech includes any wake-up words. For example, text obtained by recognizing the speech of a speaker may be compared against entries in a list of wake-up words associated with the speaker. ASR/NLU component 126 may include at least one NLU engine configured to perform one or more NLU techniques to infer a speaker's intent (e.g., to determine an action that the speaker wishes to perform), and may include processor-executable instructions that, when executed by system 100, perform such NLU technique(s).

In some embodiments, data store 125 may be configured to store information about one or more speakers registered (e.g., enrolled) with the system 100. For example, data store 125 may store information about a speaker's identity such as the speaker's name and/or other information specifying the speaker's identity. As another example, data store 125 may store one or more lists of one or more wake-up words associated with the speaker. The list(s) may indicate, for a particular wake-up word, the speech-enabled application(s) for which the particular wake-up word may be used as a voice trigger. As yet another example, data store 125 may store access control information associated with a speaker (e.g., information indicating which speech-enabled applications the speaker is or is not allowed to control). As yet another example, data store 125 may store information about a speaker's behavior including, but not limited to, information indicating one or more speech-enabled applications that the speaker previously accessed, information indicating where a speaker is usually located when issuing commands (e.g., driver's seat), and information indicating the speaker's preferences and/or interests (e.g., the speaker's favorite radio show, television channel, music genre, etc.). As yet another example, data store 125 may store information about a speaker that can be using for adapting a speech recognizer to the speaker (e.g., one or more enrollment utterances). Additionally or alternatively, data store 125 may be configured to store any other suitable information that may be used by system 100 to perform wake-up word detection. For example, data store 125 may be configured to store information obtained from one or more sensors (e.g., sensors 114 described above).

Figure 4:
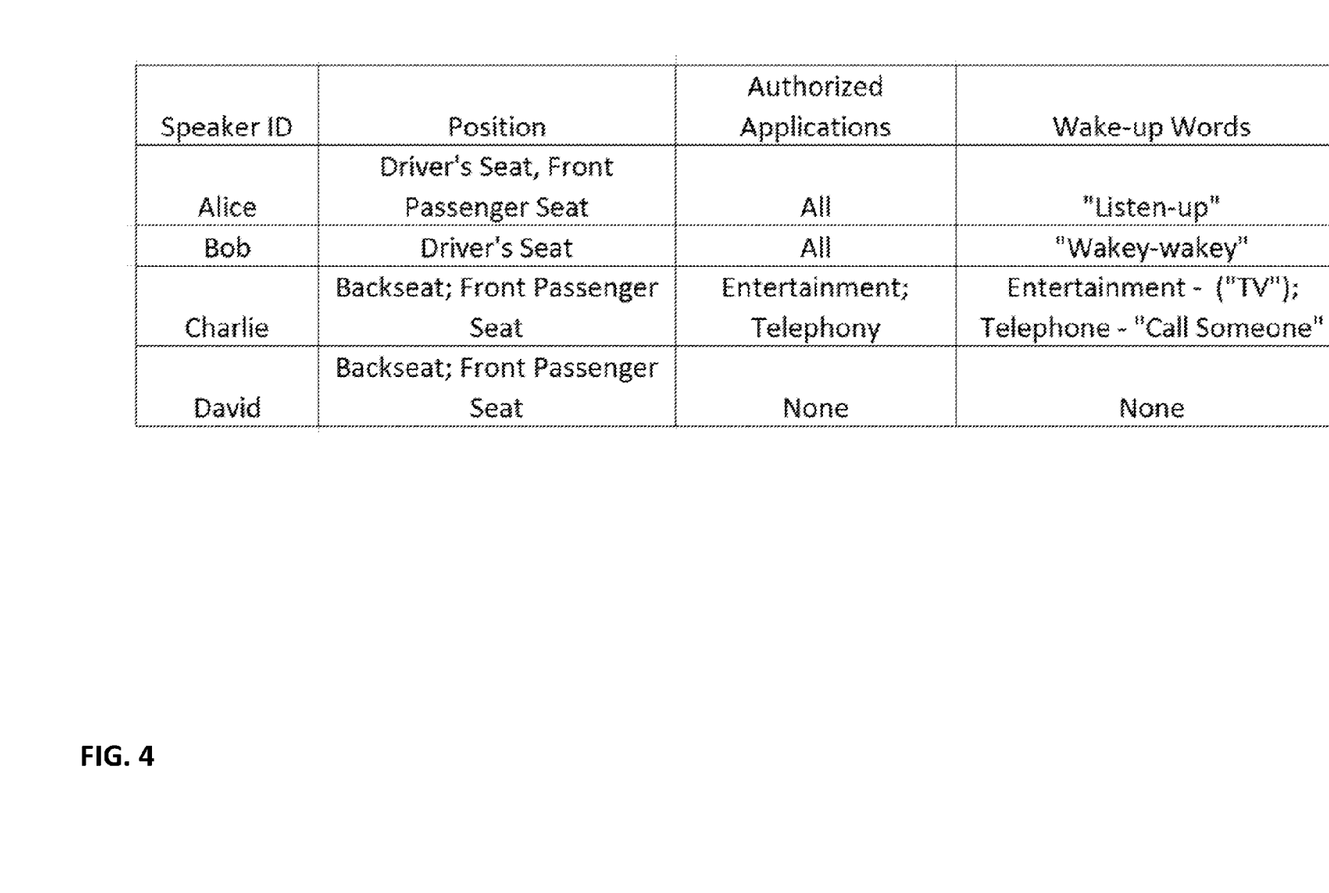
FIG. 4 is an illustration of data associated with one or more speakers that may be used in performing wake-up word detection, in accordance with some embodiments of the technology described herein.

In some embodiments, data store 125 may organize at least some of the data in multiple data records. There may be any suitable number of data records in data store 125, and they may be formatted in any suitable way. A data record may include information associated with a speaker including, for example, at least some (e.g., all) of the types of information described above. For example, as shown in FIG. 4, data store 125 may store multiple data records, each of the data records including information identifying a speaker, one or multiple positions in a vehicle that the speaker is known to have previously occupied, a list of speech-enabled applications that the speaker is authorized to trigger using a wake-up word, and a list of one or more wake-up words associated with the speaker. For example, speaker "Alice" is known to have previously occupied the driver's seat and the front passenger-side seat. Alice is authorized to trigger all speech-enabled applications using the wake-up word "Listen up." As another example, speaker "Charlie" is known to have previously occupied the backseat and the front passenger-side seat. Charlie is authorized to trigger only the entertainment and telephony applications, but not any other applications (e.g., Charlie not being a driver of the car is not allowed to trigger the speech-enabled navigation application, whereas Alice and Bob are allowed to trigger such an application because they have driven the car). Charlie may wake-up a speech-enabled application for entertainment using the wake-up word "TV" and the telephony application by using the wake-up word "Call Someone." David is not authorized to vocally activate any speech-enabled applications and the data store 125 does not store any wake-up words personalized to David. It should be appreciated that although, in some embodiments, data store 125 may organize at least some of the data using data records, aspects of the technology described herein are not limited in this respect. Data store 125 may store data in one or more databases of any suitable type, one or more files, one or more tables, using any suitable data structure(s) and/or indexing schemes.

In some embodiments, joint control logic 128 may be configured to gather information obtained from environment 110 and/or one or more other components of system 100 and process the gathered information so that it can be used presently or in the future in furtherance of one or more tasks performed by system 100 such as, for example, wake-up word detection and/or access control. In some embodiments, joint control logic 128 may be configured to organize the obtained information and store the organized information (e.g., in data store 125) and/or provide the organized information to one or more other components of system 100 (e.g., wake-up word detection component 132 and access control component 134).

In some embodiments, joint control logic 128 may obtain, from one or multiple sources, various types of information related to an utterance spoken by a speaker in environment 110 and store the organized information (e.g., in data store 125) and/or provide the organized information to one or more other components of system 100 (e.g., wake-up word detection component 132 and/or access control component 134). For example, joint control logic 128 may obtain, for a particular spoken utterance, information including the identity or likely identity of the speaker of the spoken utterance (e.g., from speaker identification component 122), a position of the speaker in the environment 110 (e.g., from acoustic analysis component 124), text corresponding to a result of performing ASR on the spoken utterance (e.g., from ASR/NLU module 126), information indicating which of speech-enabled applications 116 are executing, information associated with the speaker of the utterance (e.g., from data store 125), information indicating what speech-enabled application the speaker is attempting to vocally trigger, and/or any other suitable information related to the utterance. Information associated with the speaker of the utterance may include information indicating one or more wake-up words associated with the speaker, information indicating which speech-enabled applications that the speaker is or is not allowed to control, the speaker's preferences and/or interests, and/or any other suitable information associated with the speaker.

Accordingly, in some embodiments, information obtained by joint control logic 128 may be used to update the contents of data store 125. In some embodiments, joint control logic 128 may update the contents of data store 125 in real time with information it obtains from environment 110 and/or one or more other components of system 100.

In some embodiments, wake-up word component 132 may be configured to determine, based at least in part on information provided by joint control logic 128, whether a speaker uttered a wake-up word for any of speech-enabled application(s) 116. For example, wake-up word component 132 may determine whether the speaker uttered a wake-up word by comparing results of performing automated speech recognition on the speaker's utterance with wake-up words in a list of wake-up words associated with the speaker. Additionally or alternatively, wake-up word component may determine whether a speaker in a particular position uttered a wake-up word by comparing results of performing ASR on the speaker's utterance with wake-up words associated with any speaker who may be in the particular position. For example, even if in some instance the system 100 has not determined the speaker's identity, the system may have determined the speaker's position (e.g., the driver's seat of a car) and may have information indicating which speaker's registered with the system have previously sat in the driver's seat. The wake-up word detection component 132 may then compare results of recognizing the utterance with wake-up words associated with any speaker registered with system 100 who has previously sat in the driver's seat. It should be appreciated, however, that wake-up word component 132 may be configured to determine whether a speaker uttered a wake-up word in any other suitable way based on information available in system 100 (e.g., information obtained by joint control logic 128), as aspects of the technology described herein are not limited in this respect.

In some embodiments, access control component 134 may be configured to determine whether a speaker that has uttered a wake-up word for a speech-enabled application is authorized to vocally activate the speech-enabled application. The access control component 134 may make this determination based on information obtained from joint control logic 128. For example, access control component 134 may obtain, from joint control logic 128, information indicating the identity of a speaker, the position of the speaker, and/or the speech-enabled application that the speaker is attempting to trigger. The access control module 134 may also obtain information indicating what speech-enabled applications the identified speaker is allowed to vocally trigger and/or what speech-enabled applications can be triggered form the speaker's position. Based on the information, the access control component 134 may determine whether the speaker may vocally trigger the speech-enabled application from the position in which the speaker was speaking. When component 134 determines that the speaker is allowed to control the speech-enabled application, component 134 may grant the speaker access to the speech-enabled application. On the other hand, when component 134 determines that the speaker is not allowed to control the speech-enabled application, component 134 may limit (e.g., disallow) the speaker access to the speech enabled application. As one example, when a backseat passenger wishes to check information about a car (e.g., to determine the tire pressure of the car, amount of gas in the car, mileage of the car, speed of the car, temperature in the car, etc.) and utters the wake-up word "Hello car system" to vocally trigger the speech-enabled application for providing information about the car, access component 134 may obtain information indicating that passengers in the backseat of the car are not allowed to interact with this speech-enabled application (and/or information indicating that the particular speaker is not allowed to vocally trigger this speech-enabled application) and not allow the speaker to control the speech-enabled application for providing information about the car.

It should be appreciated that speech-enabled system 100 may be configured to process speech provided concurrently by multiple speakers that may seek to engage and/or interact with multiple speech-enabled applications in the same acoustic environment. As one illustrative example, a driver, front passenger, and a rear passenger (e.g., behind the driver) may be having a conversation in a car. The driver desires to control the speech-enabled navigation application to change the navigation destination and utters a wake-up word to vocally trigger the navigation application. Concurrently with the driver's uttering of a wake-up word, the front passenger may be speaking to the other passengers. The front passenger's speech signal may be transmitted over the in-car communication (ICC) system to the other passengers. In this scenario, the system 100 may process the speech signals detected in the car to determine that the driver has uttered a wake-up word for the navigation application (e.g., by determining the driver's identity, recognizing the driver's speech and comparing the recognized speech against wake-up words in a list of wake-up words associated with the driver) and allow the driver to vocally control the navigation application by directing speech detected by the driver's microphone to the speech-enabled navigation application and excluding the speech detected by the driver's microphone from being provided to the ICC system. In addition, the component 120 may allow the front passenger and the rear passenger to converse using the ICC system, but may prevent speech detected by their microphones from being provided to the speech-enabled navigation application with which the driver is interacting.

As another example, a driver of a car desires to start a teleconference call with the front passenger of the car and a remote party and utters a wake-up word "Hello telephone system" to vocally trigger a telephony application. At or around the same time, the backseat passenger desires to switch the television channel and utters the wake-up word "Hello television system." In this scenario, the system 100 may process the speech signals detected in the car to determine that the driver has uttered a wake-up word for the telephony application (e.g., by determining the driver's identity, the driver's position, and consulting a personalized list of wake-up words associated with the speaker), and may direct speech detected by the driver's microphone to the telephony application. Similarly, the system 100 may process the speech signals detected in the car to determine that the backseat passenger has uttered a wake-up word for the speech-enabled entertainment program, and may direct speech detected by the backseat passenger's microphone.

It should be appreciated that system 100 is illustrative and that there are variations of system 100. For example, in some embodiments, components 132 and 134 may be part of the same component and/or may be part of smart acoustic scene analysis component 120. More generally, the functions performed by the components illustrated in the embodiment of FIG. 1, may be performed by one or more other components in other embodiments. It should also be appreciated that system 100 may have one or more other components in addition to or instead of the component illustrated in FIG. 1.

Figure 2:
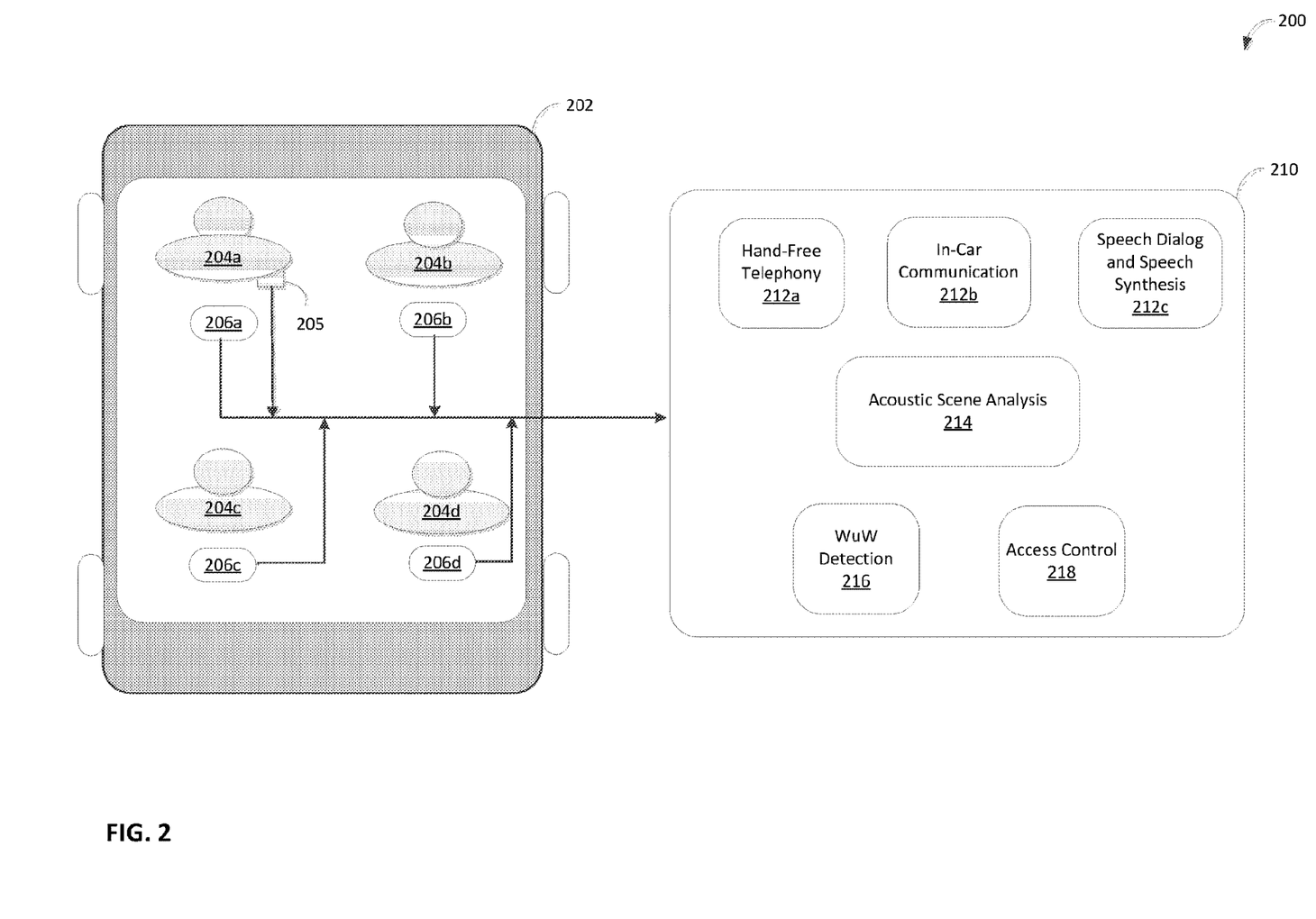
FIG. 2 is a block diagram of another illustrative speech-enabled system, in accordance with some embodiments of the technology described herein.

FIG. 2 is a block diagram of another illustrative speech-enabled system 200, in accordance with some embodiments of the technology described herein. Illustrative system 200 is part of vehicle 202 and includes microphones 206a, 206b, 206c, and 206d configured to detect speech spoken by speakers 204a, 204b, 204c, and 204d. Each of the microphones 206a-d may be configured to detect speech from any of the speakers 204a-d. Each of the microphones 206a-d may be of any suitable type, examples of which are provided herein. System 200 also includes sensor 205 configured to detect whether the driver of the car is seated. Sensor 205 may be a pressure sensor, a seatbelt sensor and/or any other suitable sensor configured to detect the present of a driver. In other embodiments, system 200 may include one or more other sensors configured to detect the presence of one or more other passengers in the car 202, but these sensors are not shown herein for clarity of presentation (and not by way of limitation).

In the illustrated embodiment, system 200 includes at least one computer hardware processor (e.g., at least one computer) 210 configured to execute multiple speech-enabled applications including, but not limited to, hands-free telephony application 212a, in-car communication application 212b, and a speech-enabled application 212c configured to support a dialog with a speaker at least in part by using speech synthesis techniques. The system 200 may be configured to receive speech utterances spoken by speakers 204*a*-*d* and be configured to determine whether any of the detected speech utterances include a wake-up word for one of the applications 212*a*-*c* and/or whether the speaker of a particular wake-up word for a particular application is authorized to control the particular speech enabled application.

In order to process acoustic signal(s) detected in the car 202 by microphone(s) 206*a*-*d* and any other sensors (e.g., sensor 205), the at least one processor 210 may be configured to execute an acoustic scene analysis component 214, a wake-up word detection component 216, and access control component 218. Acoustic scene analysis component 214 may be configured to obtain and analyze input from the car 202, including input obtained by microphones 206*a*-*d* and sensor 205. For example component 214 may be configured to obtain an acoustic signal generated by one of microphones 206*a*-*d* and perform processing in furtherance of determining whether the acoustic signal includes a wake-up word for any one of the speech-enabled application(s) 212(*a*)-(*c*). The acoustic scene analysis component 214 may be configured to operate in any of the ways described with reference to acoustic scene analysis component 120 described with reference to FIG. 1 and, in some embodiments, may include one or more components (e.g., a speaker identification component, an acoustic analysis component, an ASR/NLU component, joint control logic, etc.) described with reference to FIG. 1.

Wake-up word detection component 216 may be configured to determine, based at least in part on information provided by acoustic scene analysis component 214, whether a speaker uttered a wake-up word for any of speech-enabled application(s) 212*a*-*c*, and may operate in any of the ways described with reference to wake-up word detection component 132 described with reference to FIG. 1.

Access control component 218 may be configured to determine whether a speaker that has uttered a wake-up word for a speech-enabled application is authorized to vocally activate the speech-enabled application. The access control component 218 may make this determination based at least in part on information obtained from acoustic scene analysis component 214, and may operate in any of the ways described with reference to access control component 134 described with reference to FIG. 1.

It should be appreciated that system 200 is illustrative and that there are variations of system 200. For example, functions performed by the components illustrated in the embodiment of FIG. 2, may be performed by one or more other components in other embodiments. It should also be appreciated that system 200 may have one or more other components in addition to or instead of the component illustrated in FIG. 2.

Figure 3:
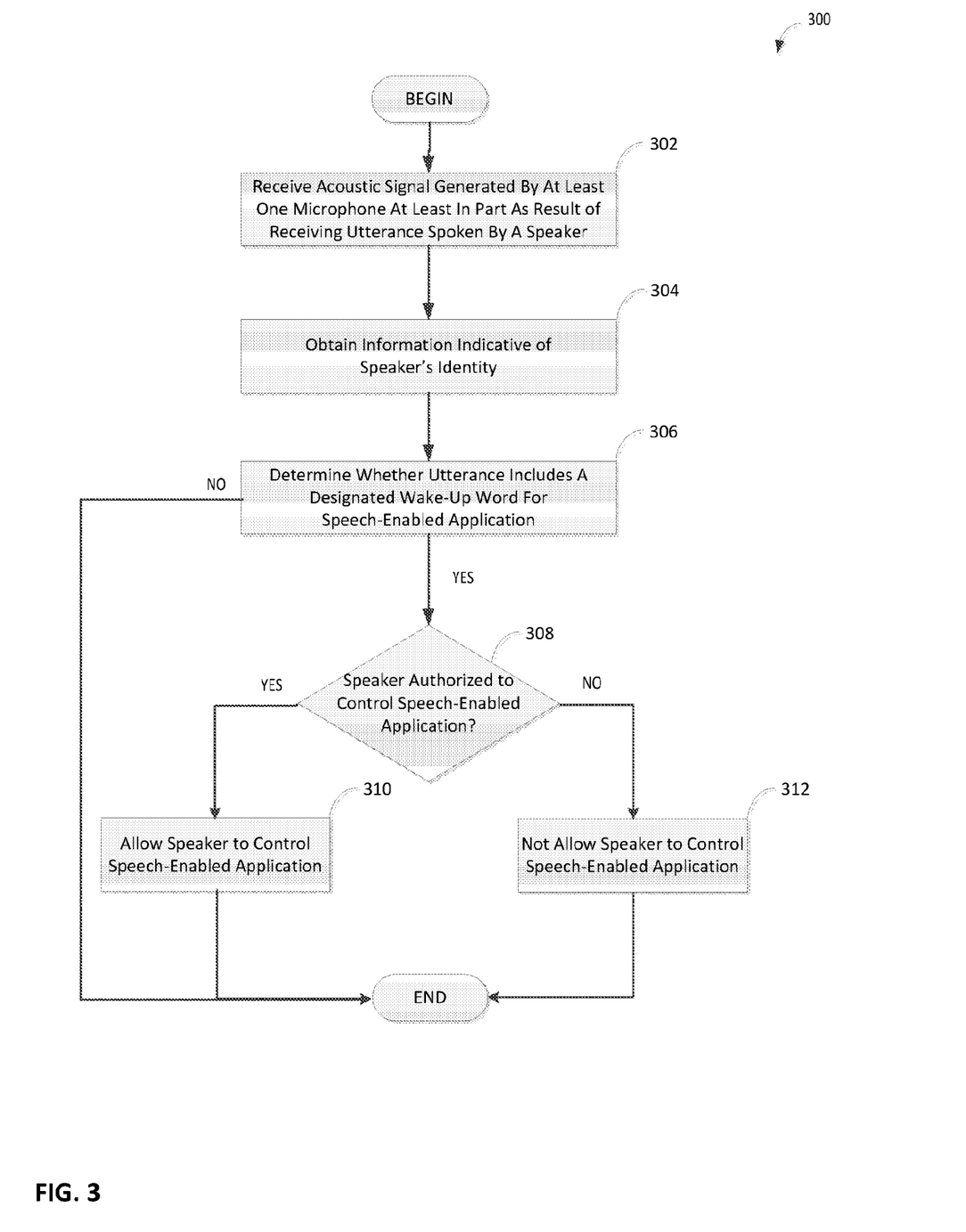
FIG. 3 is a flowchart of an illustrative process for detecting a wake-up word in an utterance based, at least in part, on information indicative of the identity of the speaker of the utterance, in accordance with some embodiments of the technology described herein.

FIG. 3 is a flowchart of an illustrative process 300 for detecting a wake-up word in an utterance based, at least in part, on information indicative of the identity of the speaker of the utterance, in accordance with some embodiments of the technology described herein. Process 300 may be performed by any suitable system in order to detect a wake-up word in an utterance and, for example, may be performed by speech-enabled system 100 described with reference to FIG. 1 or by speech-enabled system 200 described with reference to FIG. 2.

Process 300 begins at act 302, where an acoustic signal containing an utterance spoken by a speaker is received. The acoustic signal may be generated by a microphone at least in part as a result of receiving and/or detecting the utterance spoken by the speaker. For example, after a speaker utters a wake-up word for a particular speech-enabled application, a microphone may detect the utterance and generate an acoustic signal based on the detected utterance, which acoustic signal may be received at act 302. In some embodiments, multiple microphones may receive and/or detect an utterance spoken by a speaker and the acoustic signals generated by the multiple microphones may be received at act 302.

Next process 300 proceeds to act 304, where information indicative of the speaker's identity is obtained. In some embodiments, obtaining information indicative of the speaker's identity may include receiving information specifying the speaker's identity. In some embodiments, obtaining information indicative of the speaker's identity may include processing information indicative of the speaker's identity to determine the speaker's identity.

In some embodiments, for example, obtaining information indicative of the speaker's identity comprises processing the acoustic signal(s) obtained at act 302 (e.g., using voice biometrics) in order to determine the speaker's identity. For example, the system executing process 300 may obtain one or more speech characteristics (e.g., a voice print) from the acoustic signal(s) received at act 302 and compare the obtained speech characteristics against stored speech characteristics for each of multiple speakers registered with the system in order to determine the identity of a speaker. It should be appreciated, however, that any suitable speaker recognition technique(s) may be used as part of act 304 to determine the identity of a speaker from the acoustic signal(s) received at act 302, as aspects of the technology described herein are not limited in this respect.

In some embodiments, obtaining information indicative of the speaker's identity comprises determining the speaker's position in the acoustic environment. Such a determination may be made from data collected by one or more microphones and/or one or more other sensors in the acoustic environment of the speaker. For example, when multiple microphones detect a speaker's speech, the signals detected by the microphones may be used to determine the speaker's location (e.g., by using beamforming techniques). As another example, when a speaker is located in a vehicle (e.g., a car), the speaker's position may be determined at least in part by using one or more pressure sensors (e.g., in a seat, in a seatbelt, etc.) and/or other sensors (e.g., a video camera). Thus, a speaker's position may be determined by using one or more sensors of any suitable type including, but not limited to, one or more acoustic sensors, one or more pressure sensors, and one or more cameras (e.g., one or more video cameras).

In some embodiments, a speaker's position in the acoustic environment may be used to infer the speaker's likely identity or to infer identities of multiple speakers one of which is likely speaking. In some instances, the speaker's position may be used to identify a single likely speaker. For example, a speech-enabled system executing process 300 may determine that a speaker is seated in a front seat of a vehicle and, based on information indicating that speaker "S" is the most frequent driver of the vehicle, determine that "S" is the likely speaker. In other instances, the speaker's position may be used to identify multiple speakers on of which is likely speaking (e.g., when the speaker in a car is determined to be seated in the driver's seat and the speech-enabled system executing process 300 is aware of multiple adults that can drive a car) among all possible speakers. In some instances, the speaker's determined position may be used to determine which speakers are likely not speaking (e.g., the speech-enabled system may determine that although there are children registered with the speech enabled system, the children are likely not speaking because they do not drive and the speaker is determined to be seated in the driver's seat).

Next, process 300 proceeds to act 306, where it is determined whether the utterance received at act 302 includes a designated wake-up word for any speech-enabled application(s). This determination may be made based, at least in part, on the information indicative of the speaker's identity that was obtained at act 304. In some embodiments, the information indicative of the speaker's identity may specify the speaker's identity and/or be processed to determine the speaker's identity, and the speaker's identity may be used to determine whether the utterance received at act 302 includes a designated wake-up word for any speech-enabled application. The speaker's identity may be used to make this determination in any suitable way, examples of which are described herein.

In some embodiments, for example, the speaker's identity may be used to access a personalized list of one or more wake-up words associated with the identified speaker. The contents of the accessed list, in turn, may be used to determine whether the utterance received at act 302 includes a designated wake-up word for any speech-enabled application. In some embodiments, the list of one or more wake-up words associated with the identified speaker may be provided to a speech recognizer (which, for example, may be part of ASR/NLU component 126 shown in FIG. 1) for use in performing automated speech recognition on the speaker's utterance to determine whether the utterance contains any wake-up word(s) in the list of accessed wake-up words. The speech recognizer may use the list of wake-up words to facilitate the recognition of the designated wake-up word in any suitable way including, but not limited to, constraining its search space to words on the list of wake-up words, using a grammar based on the list of wake-up words, and/or adapting one or more of its components (e.g., one or more acoustic models, one or more pronunciation models, one or more language models, one or more finite state transducers, one or more lexicons or vocabularies, and/or any other suitable component(s)) based on the list of wake-up words.

Additionally or alternatively, the list of wake-up words associated with the speaker may be used to compensate for interference present in the acoustic signal(s) received at act 302, which in turn facilitates accurately determining whether or not the utterance includes the designated wake-up word for any speech-enabled application. For example, when only a portion of a particular wake-up word is recognized by a speech recognizer, the recognized portion may be compared against one or more entries in the list of wake-up words to identify that the designated wake-up word was likely spoken by the speaker even though the entire wake-up word was not recognized due to the presence of interference. As a specific example, a speaker may utter the phrase "Good morning car" as a wake-up word to a speech-enabled application in a car. However, due to interference caused by one or more other speaker's talking at the same time, the speech-enabled system performing process 300 may have only recognized the portion "morning car" of the utterance. By comparing the detected portion "morning car" to the entry "Good morning car" in the list of wake-up words associated with the speaker, the speech-enabled system may determine that, because the recognized portion at least partially matches a wake-up word in the list, the speaker likely uttered the wake-up word "Good morning car" and may allow the speaker to vocally control the speech-enabled application.

When it is determined at act 306 that the speaker's utterance did not include a designated wake-up word for any speech-enabled application, process 300 completes. On the other hand, when it is determined at act 308 that the speaker's utterance did include a designated wake-up word for a particular speech-enabled application, process 300 proceeds to decision block 308, where it is determined whether the speaker is authorized to control the particular speech-enabled application for which the speaker uttered a wake-up word. This determination may be made in any suitable way. For example, the system executing process 300 may access information indicating which speakers are (and/or are not) authorized to control the particular speech-enabled application. When the accessed information indicates that the speaker is authorized to control the particular application, a determination may be made at decision block 308 that the speaker is authorized to control the particular speech-enabled application. On the other hand, when the accessed information indicates that the speaker is not authorized to control the particular application, a determination may be made at decision block 308 that the speaker is not authorized to control the particular speech-enabled application. As another example, the system executing process 300 may access information indicating that speaker's at certain positions in the acoustic environment are (and/or are not) authorized to control the particular speech-enabled application (e.g., speaker's in the backset of a care are not authorized to control the navigation application). In this case, the speaker's position (which may be obtained at act 304 of process 300) may be used to determine whether the speaker is authorized to control the speech-enabled application.

When it is determined at decision block 308 that the speaker is authorized to control the particular speech-enabled application, process 300 proceeds to act 310 where the speaker is allowed to control the speech-enabled application, for example, by providing one or more voice commands. On the other hand, when it is determined at decision block 308 that the speaker is not authorized to control the particular speech-enabled application, process 300 proceeds to act 312 where the speech-enabled system performing process 300 takes one or more steps to not allow the speaker to control the particular speech enabled application.

It should be appreciated that process 300 is illustrative and that variations of process 300 are possible. For example, although in the illustrated embodiment, process 300 includes acts 308, 310, and 312 relating to access control functionality, in other embodiments, acts 308, 310, and 312 may be omitted or may be optional.

Figure 5:
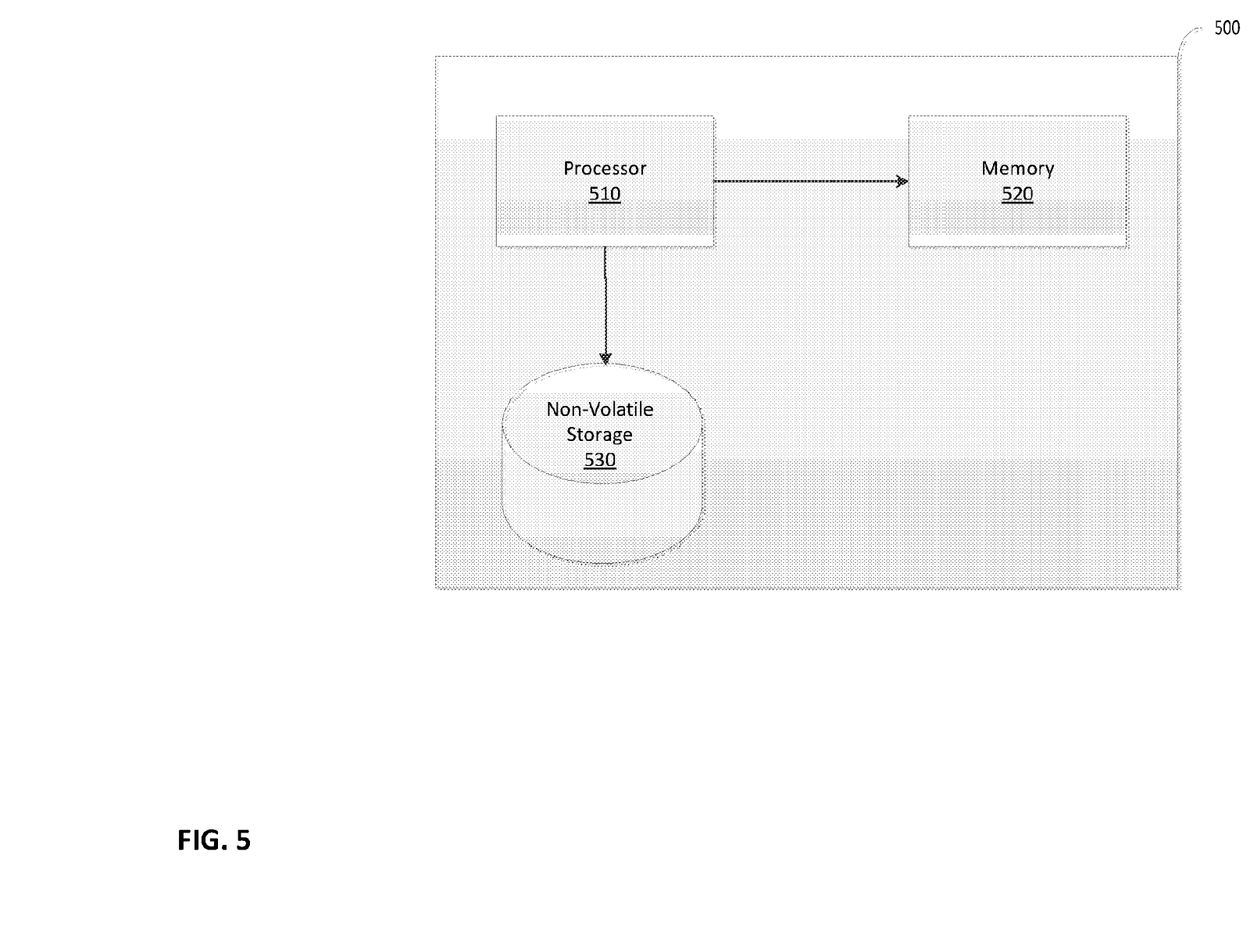
FIG. 5 is a block diagram of an illustrative computer system that may be used in implementing some embodiments of the technology described herein.

An illustrative implementation of a computer system 500 that may be used in connection with any of the embodiments of the disclosure provided herein is shown in FIG. 5. The computer system 500 may include one or more processors 510 and one or more articles of manufacture that comprise non-transitory computer-readable storage media (e.g., memory 520 and one or more non-volatile storage media 530). The processor 510 may control writing data to and reading data from the memory 520 and the non-volatile storage device 530 in any suitable manner, as the aspects of the disclosure provided herein are not limited in this respect. To perform any of the functionality described herein, the processor 510 may execute one or more processor-executable instructions stored in one or more non-transitory computer-readable storage media (e.g., the memory 520), which may serve as non-transitory computer-readable storage media storing processor-executable instructions for execution by the processor 510.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for detecting at least one designated wake-up word for at least one speech-enabled application, the system comprising:
    at least one computer hardware processor configured to perform:
        receiving a first acoustic signal generated by at least one first microphone at least in part as a result of receiving an utterance spoken by a first speaker;
        obtaining information indicative of a first speaker's identity by processing, at least in part, the first acoustic signal;
        using the information indicative of the first speakers identity to determine whether the utterance spoken by the first speaker includes at least one or more wake-up words associated with the fast speaker's identity;
        in response to determining that the utterance spoken by the first speaker includes the at least one designated wake-up word, interacting with the speaker, wherein the at least one designated wake-up word includes a first designated wake-up word for a first speech-enabled application of the at least one speech-enabled application, and wherein the first designated wake-up word is specific to the first speaker such that no other speaker can use the first designated wake-up word,
        receiving a second acoustic signal generated by at least one second microphone at least in part as a result of receiving, concurrently with the first microphone, a second utterance spoken by a second speaker;

obtaining information indicative of the second speaker's identity;

interpreting the second acoustic signal at least in part by determining, using the information indicative of the second speaker's identity and automated speech recognition, whether the second utterance spoken by the second speaker includes a second designated wake-up word for a second speech-enabled application specific to the speaker's identity; and interacting with the second speaker based, at least in part, on results of the interpreting.

2. The system of claim 1, wherein interacting with the speaker comprises allowing the speaker to control the at least one speech-enabled application.

3. The system of claim 1, wherein the at least one computer hardware processor is configured to use the information indicative of the speaker's identity to determine whether the speaker is authorized to control the at least one speech-enabled application, and to allow the speaker to control the at leas one speech-enabled application if it is determined that the speaker is authorized to control the at least one speech-enabled application, and not allow the speaker to control the at least one speech-enabled application if it is determined that the speaker is not authorized to control the at least one speech-enabled application.

4. The system of claim 1, wherein obtaining the speakers identity comprises:

obtaining speech characteristics from the first acoustic signal;

comparing the obtained speech characteristics against stored speech characteristics for each of multiple speakers registered with the system.

5. The system of claim 1, wherein determining whether the utterance spoken by the speaker includes the at least one designated wake-up word comprises:

using automated speech recognition to determine whether the utterance spoken by the speaker includes a wake-up word in the one or more wake-up words, wherein the automated speech recognition is performed using the one or more wake-up words associated with the speaker identity.

6. The system of claim 1, wherein obtaining information indicative of the speaker's identity comprises determining a position of the speaker in an environment.

7. The system of claim 6, wherein the at least one computer hardware processor is configured to determine, using the position of the speaker in the environment, whether the speaker is authorized to control the at least one speech-enabled application, and to allow the speaker to control the at least one speech-enabled application if it is determined that the speaker is authorized to control the at least one speech-enabled application, and not allow the speaker to control the at least one speech-enabled application if it is determined that the speaker is not authorized to control the at least one speech-enabled application.

8. The system of claim 6, wherein the at least one computer hardware processor is configured to determine the position of the speaker inside a vehicle based, at least in part, on information gathered by at least one sensor in the vehicle.

9. The system of claim 6, wherein the at least one computer hardware processor receives the first and second acoustic signals from a plurality of microphones, and wherein the position of the speaker is determined using the acoustic signals received from the plurality of microphones.

10. The system of claim 1, wherein the at least one microphone comprises a plurality of microphones installed in a respective plurality of acoustic ones inside of a vehicle, wherein each of the plurality of acoustic zones comprises a seating area for a passenger in the vehicle.

11. The system of claim 1, wherein interacting with the speaker comprises inferring, based at least in part on the information indicative of the speaker's identity, at least one action to take when interacting with the speaker.

12. The system of claim 1, wherein obtaining information indicative of the speaker's identity composes obtaining the speaker's identity; and wherein determining whether the utterance spoken by the speaker includes the at least one designated wake-up word comprises:

accessing a list of wake-up words associated with the speaker's identity; and determining whether the utterance includes any wake-up word in the list of wake-up words associated with the speaker's identity.

13. The system of claim 1, wherein determining whether the utterance spoken by the speaker includes the at least one designated wake-up word comprises:

compensating for interference received by the at least one microphone by using the information associated with the speaker's identity.

14. The system of claim 1, wherein the at least one computer hardware processor is further configured to store the information about the speaker's identity in at least one data store.

15. The system of claim 14, wherein the at least one data store comprises a plurality of data records including a first data record, the first data record comprising information selected from the group consisting of an identity of a particular speaker, a position of the particular speaker in an environment, a list of one or more wake-up words associated with the particular speaker, a list of one or more speech-enabled applications that the particular speaker is allowed to control, a list of one or more speech-enabled applications that the particular speaker is not allowed to control, and information obtained from one or more sensors.

16. A method for detecting at least one designated wake-up word for at least one speech-enabled application, the method comprising:

using at least one computer hardware processor to perform:

receiving a first acoustic signal generated by at least one microphone at least in part as a result of receiving an utterance spoken by a first speaker;

obtaining information indicative of the first speaker's identity;

using the information indicative of the first speaker's identity to determine whether the utterance spoken by the first speaker includes the at least one designated wake-up word associated with the speaker's identity;

in response to determining that the utterance spoken by the first speaker includes the at least one designated wake-up word, interacting with the first speaker;

receiving a second acoustic signal generated by at least one second microphone at least in part as a result of receiving, concurrently with the first microphone a second utterance spoken by a second speaker;

obtaining information indicative of the second speaker's identity;

interpreting the second acoustic signal at least in part by determining using the information indicative of the second speaker's identity and automated speech recognition whether the second utterance spoken by the second speaker includes a second designated wake-up word for a second speech-enabled application specific to the speaker's identity; and interacting with the second speaker based, at least in part, on results of the interpreting.

17. At least one non-transitory computer-readable storage medium storing processor-executable instructions that, when executed by at least one computer hardware processor, cause the at least one computer hardware processor to perform a method for detecting at least one designated wake-up word for at least one speech-enabled application, the method comprising:

receiving a first acoustic signal generated by at least one first microphone at least in part as a result of receiving an utterance spoken by a first speaker;

obtaining information indicative of the first speaker's identity;

using the information indicative of the first speaker's identity to determine whether the utterance spoken by the first speaker includes the at least one designated wake-up word associated with the speaker's identity;

in response to determining that the utterance spoken by the speaker includes the at least one designated wake-up word, interacting with the speaker;

receiving a second acoustic signal generated by at least one second microphone at least in part as a result of receiving, concurrently with the first microphone, a second utterance spoken by a second speaker;

obtaining information indicative of the second speaker's identity;

interpreting the second acoustic signal at least in part by determining, using the information indicative of the second speaker's identity and automated speech recognition, whether the second utterance spoken by the second speaker includes a second designated wake-up word for a second speech-enabled application specific to the speaker's identity; and interacting with the second speaker based, at least in part, on results of the interpreting.

* * * * *